(12) United States Patent
Kamiyama

(10) Patent No.: US 6,341,113 B1
(45) Date of Patent: Jan. 22, 2002

(54) SERVO DEVICE FOR RECORDING MEDIUM PLAYER

(75) Inventor: Hideyo Kamiyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/392,662

(22) Filed: Sep. 9, 1999

(30) Foreign Application Priority Data

Sep. 10, 1998 (JP) .......................................... 10-257075

(51) Int. Cl.$^7$ ................................................ G11B 7/00
(52) U.S. Cl. ................................ 369/53.15; 369/44.29; 369/44.32
(58) Field of Search ........................... 369/44.27, 44.29, 369/44.34, 44.35, 53.15, 47.25

(56) References Cited

U.S. PATENT DOCUMENTS 6,249,494 B1 * 6/2001 Ueki ........................ 369/44.29

* cited by examiner

*Primary Examiner*—Nabil Hindi
(74) *Attorney, Agent, or Firm*—Sughrue Mion, PLLC

(57) ABSTRACT

A servo device for controlling a reading operation of a pickup in a recording medium player, which generates a servo error signal indicative of an amount of deviation of a position at which the pickup of the recording medium player is reading for playing a recording medium. The servo device detects a blemish at a reading point focused by the pickup on the recording medium to generate a blemish detecting signal when a blemish is detected, and generates a servo hold signal based on a low frequency component of the servo error signal. The servo hold signal includes, immediately after the generation of the blemish detecting signal, a signal of opposite polarity to the polarity of the servo error signal immediately before generation of the blemish detecting signal. Further, the servo device controls the reading operation of the pickup in accordance with the servo hold signal in place of the servo driving signal during the time that the blemish detecting signal is generated.

3 Claims, 7 Drawing Sheets

SERVO DEVICE FOR RECORDING MEDIUM PLAYER

BACKGROUND OF THE INVENTION

1. Field of the Invention

The present invention relates to a servo device such as a tracking servo device in a player for playing a recording medium including a disk and so on.

2. Description of the Related Background Art

In an optical disk player, a tracking servo device is indispensable for controlling a reading point of a pickup to the center of a track on an optical disk. The tracking servo device generates a tracking error signal indicative of the amount of deviation of the reading point with respect to the track in the radial direction of the disk, such that the pickup operates in response to the tracking error signal. In addition, when blemishes are on a track of an optical disk, it is impossible to generate an appropriate tracking error signal. Thus, some tracking servo devices are provided with a tracking hold function as a servo hold function, for solving the problem.

In a conventional tracking servo device having a tracking hold function, as illustrated in FIG. 1, a tracking error signal generator 2 generates a tracking error signal indicative of the amount of deviation of a reading point with respect to a track in the radial direction of a disk based on an output signal of a pickup 1. For generating a tracking error signal, three methods are known, a three-beam method, a push-pull method, and a time difference detecting method. The tracking error signal from the tracking error signal generator 2 is supplied to a tracking driving circuit 5 as a tracking driving signal through an equalizer 3 and a change-over switch 4. The tracking driving circuit 5 drives a tracking actuator (not shown) within the pickup 1 in response to the tracking driving signal.

For the tracking hold function, an LPF (low pass filter) 7 is disposed between the tracking error signal generator 2 and the change-over switch 4. The LPF 7 outputs a low frequency component (a DC offset component due to eccentricity of the optical disk, or the like) other than a rapid change component in the tracking error signal. A defect detector 8 is also disposed for detecting blemishes (including defects) at a reading point based on an output signal of the pickup 1. The defect detector 8 generates a DEF signal when it detects a blemish, so that the change-over switch 4, responsive to the DEF signal, supplies the tracking driving circuit 5 with an output signal of the LPF 7 as a servo hold signal in place of an output signal of the equalizer 3.

With the configuration described above, when an RF signal, i.e., a read signal output from the pickup 1, has decreased to a lower level due to a blemish on the disk as illustrated in FIG. 2A, the tracking error signal from the tracking error signal generator 2 fluctuates up and down and therefore becomes unstable, as illustrated in FIG. 2B. The defect detector 8 generates the DEF signal of a high level as illustrated in FIG. 2C due to the decrease of the RF signal level. As described above, the change-over switch 4 is responsive to the DEF signal to supply the tracking driving circuit 5 with the output signal of the LPF 7 in place of the output signal of the equalizer 3. The output signal of the LPF 7, the level of which is substantially constant as illustrated in FIG. 2D during the time that the DEF signal is generated, is supplied to the tracking driving circuit 5 as the tracking driving signal.

In the conventional tracking servo device provided with a tracking hold function as described, the tracking error signal supplied to the tracking driving circuit 5 immediately before the generation of the DEF signal may include a large fluctuating component as indicated by a circle X in FIG. 2E. The large fluctuating component is caused by a detection sensitivity of the defect detector 8 which is not set so high. If the defect detector 8 has a higher detection sensitivity, the large fluctuating component is improved. Since the defect detector 8 with the higher detection sensitivity detects even small blemishes which do not require the tracking hold function to operate and then generates the DEF signal, the detection sensitivity of the defect detector 8 should not be set at a high level.

However, since the tracking actuator has an operation characteristic of an LPF and performs an integration operation, a large fluctuating component included in the tracking error signal supplied to the tracking driving circuit 5 immediately before the generation of the DEF signal causes the tracking actuator to move the reading point gradually away from the center of the track during the generation of the DEF signal, as illustrated in FIG. 2F, thereby preventing the tracking hold function from sufficiently taking effect.

The problem is not limited to the tracking servo device but similarly occurs in other servo devices having the servo hold function, such as a focus servo device.

SUMMARY OF THE INVENTION

It is therefore an object of the present invention to provide a servo device for a recording medium player which is capable of maintaining an appropriate servo state even if a reading point has passed through a portion including a blemish on a recording medium.

The present invention provides a servo device for a recording medium player, which generates a servo error signal indicative of an amount of deviation of a position at which a pickup of the recording medium player is reading for playing a recording medium, generates a servo driving signal from the servo error signal through an equalizer, and controls a reading operation of the pickup in accordance with the servo driving signal. The servo device includes blemish detecting means for detecting a blemish at a reading point by the pickup on the recording medium to generate a blemish detecting signal when a blemish is detected; a first low frequency extracting means for extracting a low frequency component from the servo error signal; and control means for generating a servo hold signal based on an output signal of the first low frequency extracting means, wherein the servo hold signal includes, immediately after the generation of the blemish detecting signal, a signal of opposite polarity to the polarity of the servo error signal immediately before generation of the blemish detecting signal, and for controlling the reading operation of the pickup in accordance with the servo hold signal in place of the servo driving signal during the time that the blemish detecting signal is generated.

According to the servo device for a recording medium player of the present invention, when a servo error signal includes a large fluctuating component immediately before the generation of a blemish detecting signal, a servo hold signal is generated including a signal of opposite polarity to that of the servo error signal immediately after the generation of the blemish detecting signal, so that a reading operation of a pickup is controlled in accordance with the servo hold signal in place of a servo driving signal during the time that the blemish detecting signal is generated. Therefore, even if a reading point passes through a blemish on a recording medium, it is possible to maintain an appropriate servo state immediately before passing through the blemish.

DETAILED DESCRIPTION OF THE PREFERRED EMBODIMENTS

Embodiments of the present invention will hereinafter be described in detail with reference to the accompanying drawings.

Figure 1:
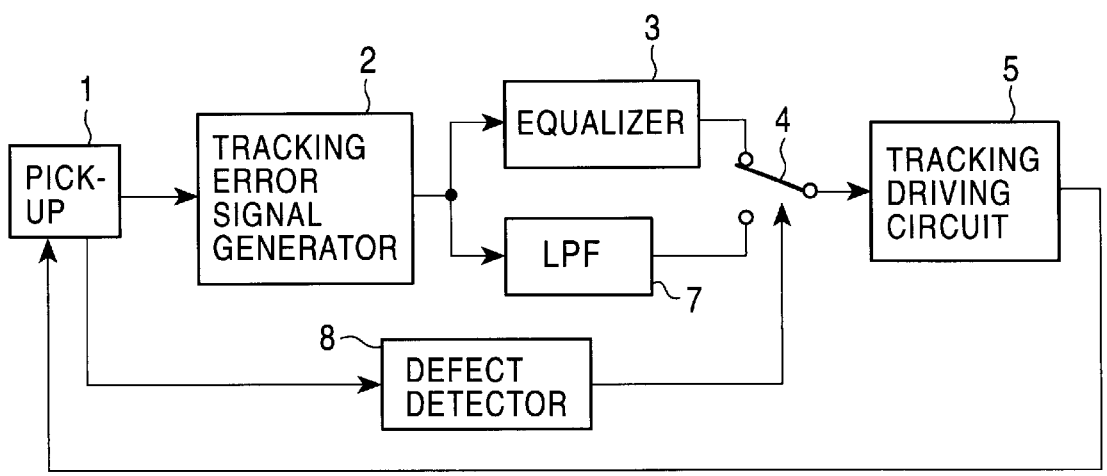
FIG. 1 is a block diagram illustrating a conventional tracking servo device.
Figure 2A:
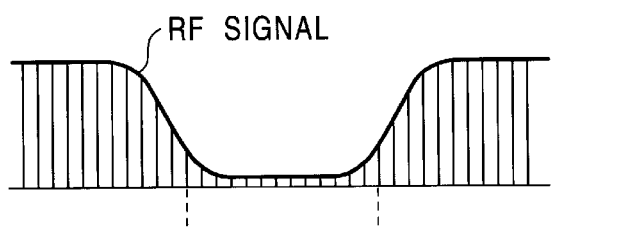
FIGS. 2A to 2F are waveform charts illustrating the operation of the device of FIG. 1.
Figure 2B:
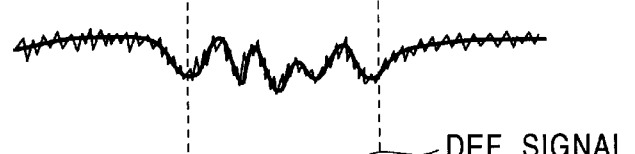
Figure 2C:
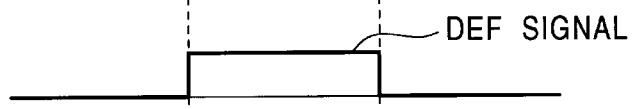
Figure 2D:
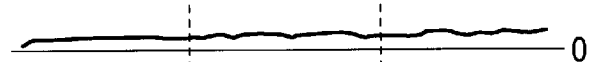
Figure 2E:
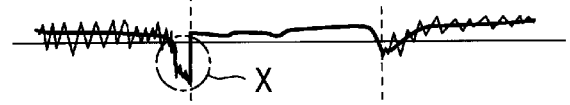
Figure 2F:
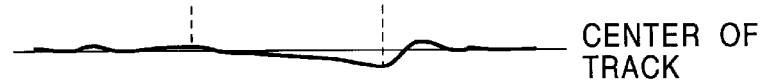
Figure 3:
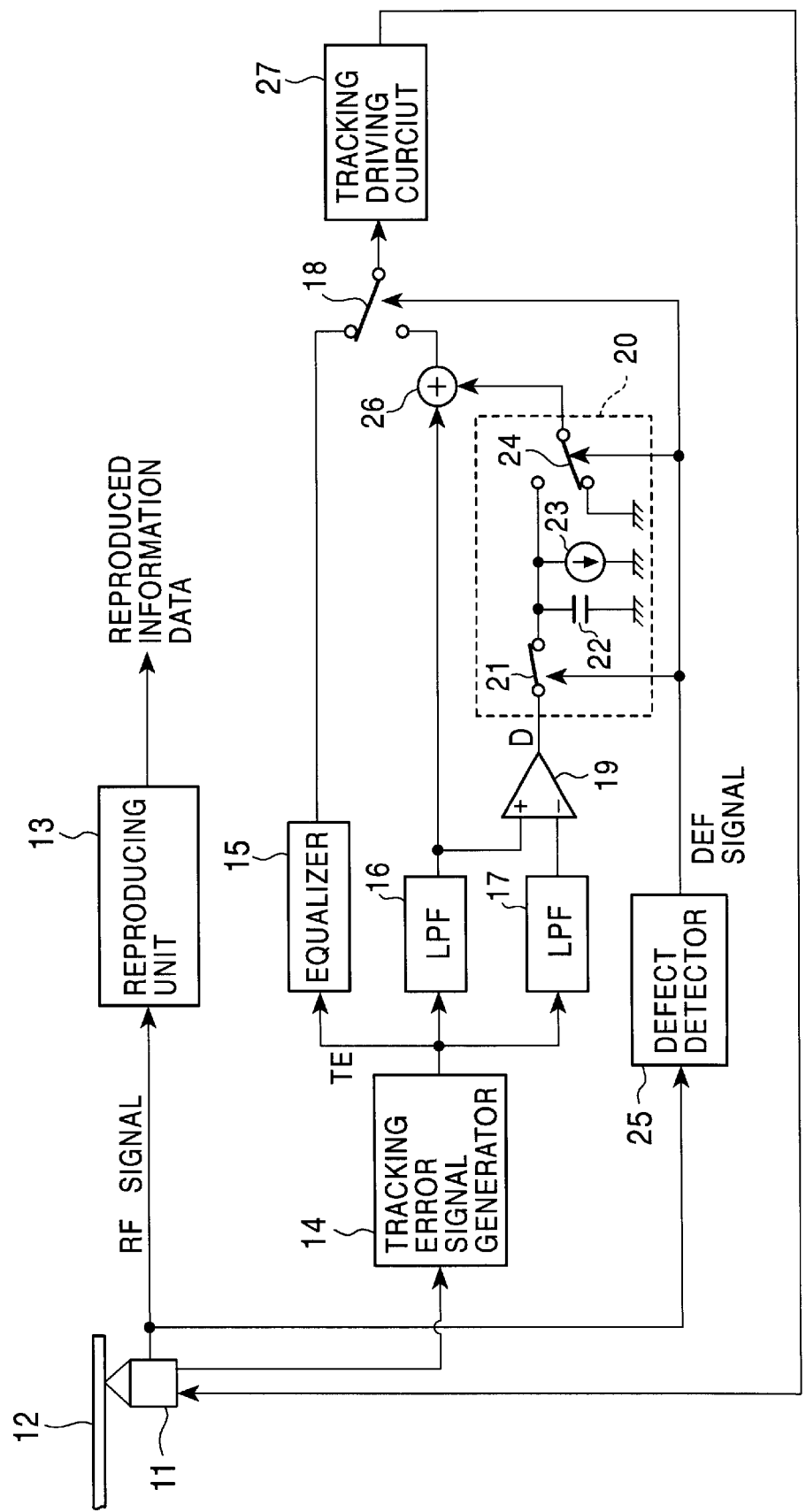
FIG. 3 is a block diagram illustrating an embodiment of the present invention.

FIG. 3 illustrates a tracking servo device as an embodiment of the present invention. In the illustrated tracking servo device, a pickup 11 irradiates an optical disk 12 with laser light, and receives light reflected from the optical disk 12 to generate a signal corresponding to the amount of received light. Here, the pickup 11 includes a light receiving device (not shown) divided into four sections. Assuming that output signals of four light receiving elements of the divided receiving device are a, b, c, d, the sum of the output signals a+b+c+d is generated as an RF signal, i.e., a read signal. The RF signal is supplied to a reproducing unit 13 and a defect detector 25. The reproducing unit 13 reproduces information recorded on the optical disk 12 in accordance with the RF signal. The defect detector 25, later described, detects blemishes on a disk in accordance with the RF signal, and generates a high level DEF signal (blemish detecting signal) when it detects a blemish, in a manner similar to the defect detector 8 in the conventional tracking servo device of FIG. 1. It should be noted that blemishes on a disk include defects.

A tracking error signal generator 14 calculates a phase difference (a+c)−(b+d) between two sum signals a+c, b+d of output signals of two sets of the receiving elements placed in an opposite positioning relationship with respect to the intersection of two bisectors on the light receiving surface of the light receiving device. The result of the calculation indicates a tracking error signal (servo error signal).

The tracking error signal generator 14 is connected to an equalizer 15, an LPF 16 and an LPF 17. The equalizer 15 compensates the tracking error signal for the phase and frequency characteristics. The LPF 16 extracts a low frequency components (substantially a DC offset component) from the tracking error signal. The LPF 17 extracts a low frequency component including a fluctuating portion from the tracking error signal. The cut-off frequency f2 of the LPF 17 is chosen to be higher than the cut-off frequency f1 of the LPF 16.

The output of the equalizer 15 is connected to one of two fixed contacts of a change-over switch 18. A subtractor 19 is connected to the outputs of the LPFs 16, 17. The subtractor 19 subtracts an output signal of LPF 17 from an output signal of the LPF 16 to extract only the fluctuating portion from the tracking error signal in the opposite polarity. The output of the subtractor 19 is connected to a sample and hold circuit 20.

The sample and hold circuit 20 comprises an on/off switch 21, a capacitor 22, a current source 23, and a change-over switch 24. The on/off switch 21 is disposed between the output of the subtractor 19 and one end of the capacitor 22, the other end of which is connected to the ground. The current source 23 is connected in parallel with the capacitor 22. The change-over switch 24 has one of its two fixed contacts connected to a connection line including the on/off switch 21, capacitor 22 and current source 23, and the other end connected to the ground. A movable contact of the change-over switch 24 serves as the output of the sample and hold circuit 20, and is connected to an adder 26.

The on/off switch 21 and the change-over switch 24 are supplied at their respective control terminals with a DEF signal from the defect detector 25. When the on/off switch 21 is not supplied with the DEF signal from the defect detector 25, i.e., when its control terminal is at a low level, the on/off switch 21 turns on to supply the capacitor 22 with an output voltage of the subtractor 19. Conversely, the on/off switch 21 turns off when it is supplied with the DEF signal of a high level from the defect detector 25. The change-over switch 24 supplies the adder 26 with a low level equal to the ground level of the other fixed contact when it is not supplied with the DEF signal from the defect detector 25, and supplies the adder 26 with a potential at the one fixed contact, i.e., a potential at the one end of the capacitor 22 when it is supplied with the DEF signal of a high level from the defect detector 25.

The adder 26 adds the output level of the LPF 16 and the output level supplied by the change-over switch 24. The output of the adder 26 is connected to the other fixed contact of the change-over switch 18. The change-over switch 18 supplies an output signal of the equalizer 15 to the tracking driving circuit 27 as a tracking driving signal (servo driving signal) when it is not supplied with the DEF signal from the defect detector 25, and supplies an output signal of the adder 26 to the tracking driving circuit 27 as a servo hold signal when it is supplied with the DEF signal of a high level from the defect detector 25. The tracking driving circuit 27 drives an actuator (not shown) within the pickup 11 in response to the tracking driving signal or the servo hold signal to move a reading point in the radial direction of the disk 12.

Figure 4:
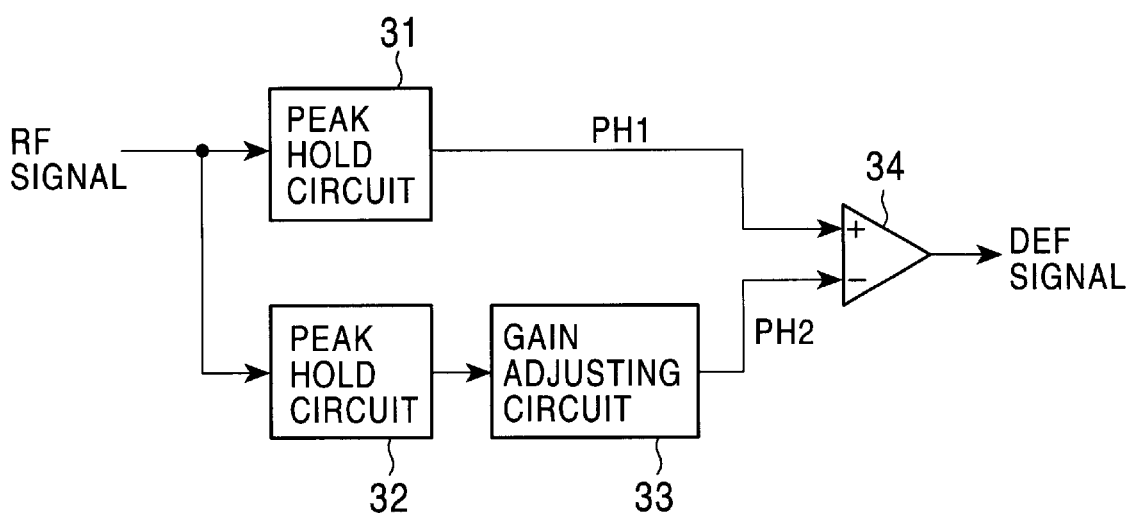
FIG. 4 is a block diagram illustrating a specific configuration of a defect detector.

As illustrated in FIG. 4, the defect detector 25 comprises peak hold circuits 31, 32, a gain adjusting circuit 33, and a comparator 34. The peak hold circuits 31, 32 hold a peak level of the RF signal. The peak hold circuit 31 has a time constant larger than that of the peak hold circuit 32. The gain adjusting circuit 33 is provided for adjusting the sensitivity for detecting blemishes and varies the output level and offset level of the peak hold circuit 32. The comparator 34 generates a high-level output when the output level of the gain adjusting circuit 33 is below the output level of the peak hold circuit 31, and the high-level output serves as the DEF signal.

Next, description will be made on the operation of the tracking servo device according to the present invention configured as described above.

Figure 5A:
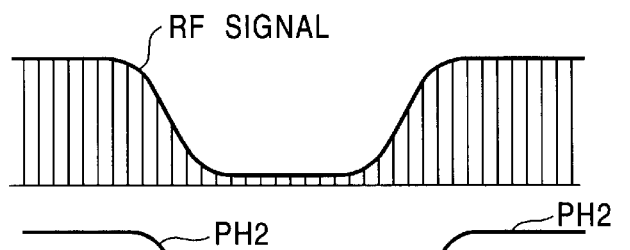
FIGS. 5A to 5K are waveform charts illustrating the operation of the device of FIG. 3.
Figure 5B:
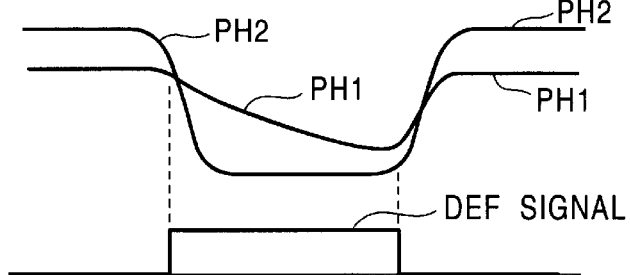
Figure 5C:
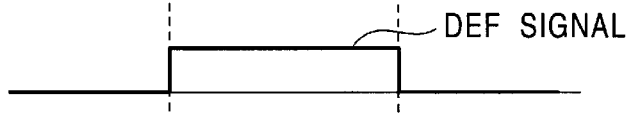

Assuming that a disk has a blemish on a track, the level of an RF signal output from the pickup circuit 11 is decreased due to the blemish, as illustrated in FIG. 5A. In the case, when a peak hold signal PH1 through the peak hold circuit 31 and a peak hold signal PH2 through the peak hold circuit 32 after its gain has been adjusted by the gain adjusting circuit 32 vary as illustrated in FIG. 5B, the DEF signal is generated when PH1>PH2 is satisfied, as illustrated in FIG. 5C.

Figure 5D:

On the other hand, a tracking error signal TE is normally supplied to the tracking driving circuit 27 as a tracking driving signal through the equalizer 15 and the change-over switch 18. The tracking error signal TE changes to a low level slightly before the DEF signal is generated, due to a blemish on the track, and fluctuates up and down as illustrated in FIG. 5D.

Figure 5E:
Figure 5F:
Figure 5G:
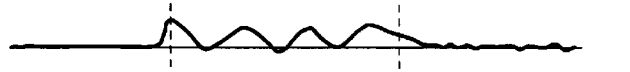

The tracking error signal TE is also supplied to the LPFs 16, 17. The LPF 16 removes the up and down fluctuating portion of the tracking error signal ET and extracts substantially a DC offset component (disk eccentricity component or the like) as illustrated in FIG. 5E, while the LPF 17 extracts a low frequency component including the fluctuating portion from the tracking error signal TE as illustrated in FIG. 5F. The DC offset component is a shift component of the pickup 11 itself in the radial direction of the disk. The subtractor 19 subtracts the output signal level of the LPF 17 from the output signal level of the LPF 16 to produce a difference signal D which has the DC offset component excluded from the output signal of the LPF 17 and the inverted polarity, as illustrated in FIG. 5G. Since the difference signal D is supplied to the capacitor 22 through the on/off switch 21 when the DEF signal is not generated, the capacitor 22 holds the level of the difference signal D.

Figure 5H:

When the tracking error signal TE substantially decreases immediately before the generation of the DEF signal, the level of the difference signal D applied to the capacitor 22 rises as illustrated in FIG. 5H. However, since the generated DEF signal turns the on/off switch 21 off, the capacitor 22 is not supplied with the difference signal D, causing electrical energy accumulated on the capacitor 22 to discharge through the current source 23. Thus, the terminal voltage of the capacitor 22 gradually lowers in accordance with a predetermined time constant from the time the generation of the DEF signal is started, as illustrated in FIG. 5H.

Figure 5I:
Figure 5J:

Since the change-over switch 24 outputs the terminal voltage of the capacitor 22 in place of the ground level during a period in which the DEF signal is generated, a triangular wave signal as illustrated in FIG. 5I is generated as an output signal of the sample and hold circuit 20 immediately after the DEF signal is generated. The triangular wave signal is added to the output signal of the LPF 16 in the adder 26, and then supplied to the tracking driving circuit 27 through the change-over switch 18. Consequently, the signal supplied to the tracking driving circuit 27 substantially decreases immediately before the generation of the DEF signal, and then substantially increases immediately after the generation of the DEF signal, as illustrated in FIG. 5J.

Figure 5K:

Since the tracking driving circuit 27 drives the tracking actuator in accordance with the supplied signal, an integration operation of the tracking actuator cancels a negative large fluctuating component included in the tracking driving signal supplied to the tracking driving circuit 27 immediately before the generation of the DEF signal and a positive large fluctuating component included in the tracking driving signal immediately after the generation of the DEF signal. Thus, the tracking actuator continuously maintains the reading point on the center of the track during a period in which the DEF signal is generated, as illustrated in FIG. 5K.

Figure 6:
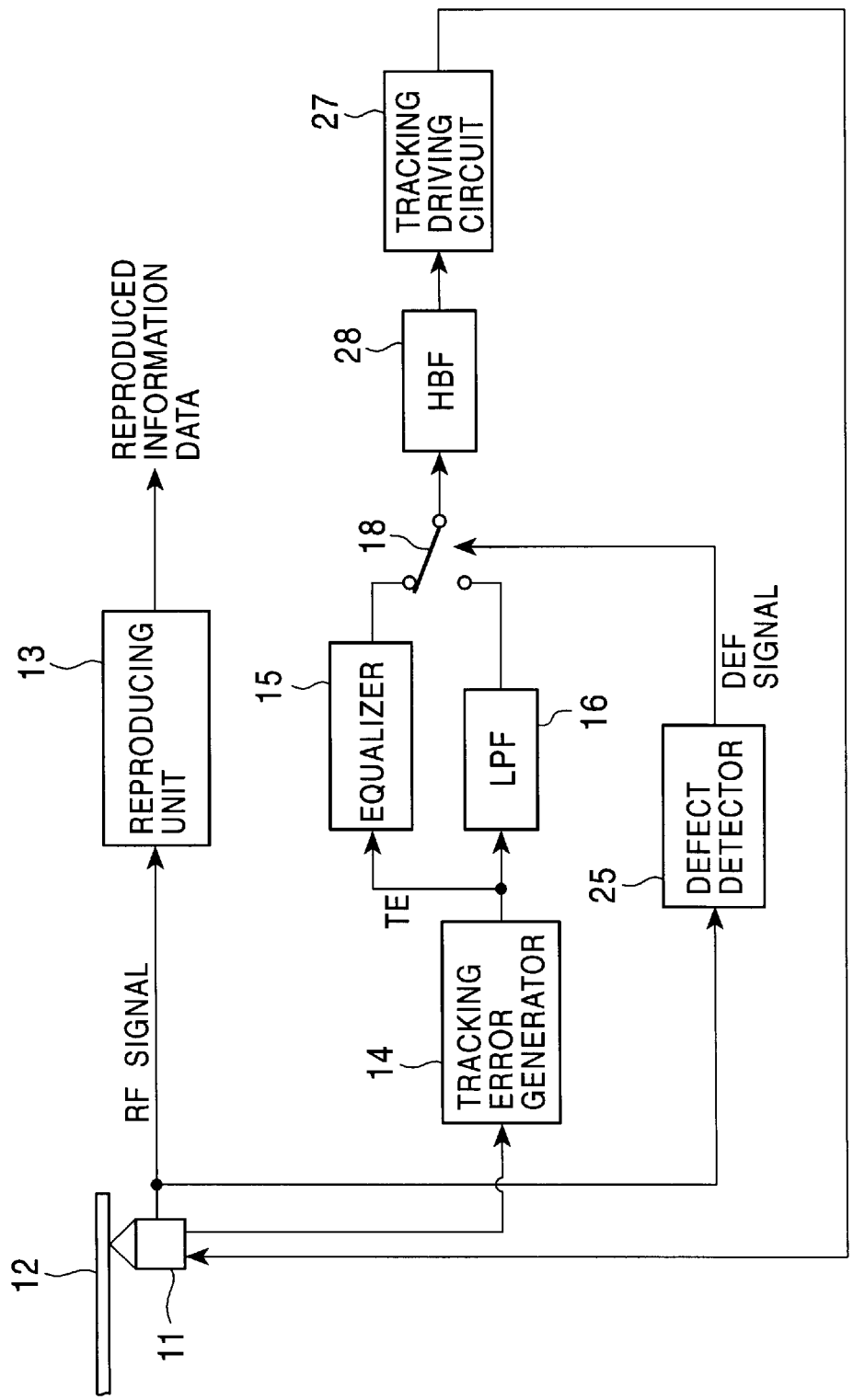
FIG. 6 is a block diagram illustrating another embodiment of the present invention.

FIG. 6 illustrates a tracking servo device as another embodiment of the present invention. In the tracking servo device of FIG. 6, identical parts to those in the device of FIG. 3 are designated by using the same reference numerals. The output of the LPF 16 is directly connected to the other fixed contact of the change-over switch 18. Also, the moving contact of the change-over switch 18 is connected to the tracking driving circuit 27 through an HBF (high boost filter) 28. The remaining configuration is similar to that of FIG. 3 except that the LPF 17, subtractor 19, sample and hold circuit 20, and adder 26 are excluded.

Figure 7A:
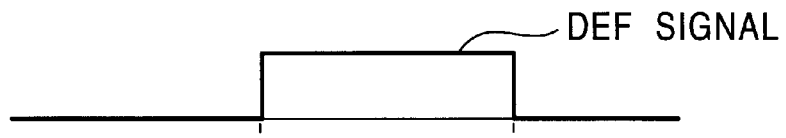
FIGS. 7A to 7C are waveform charts illustrating the operation of the device of FIG. 6.
Figure 7B:
Figure 7C:

In the device of FIG. 6, the change-over switch 18 supplies an output signal of the equalizer 15 to the HBF 28 until immediately before the generation of the DEF signal illustrated in FIG. 7A, and supplies an output signal of the LPF 16 to the HBF 28 during a period in which the DEF signal is generated. At the input of the HBF 28, a signal level substantially decreases immediately before the DEF signal is generated as illustrated in FIG. 7B, and the generated DEF signal immediately changes the output signal of the LPF 16, i.e., a DC offset component to maintain the offset level. In response to the change of the input level, the HBF 28 generates an output signal which has a level decreasing immediately before the generation of the DEF signal, and increasing immediately after the generation of the DEF signal, as illustrated in FIG. 7C. Since the tracking driving circuit 27 is supplied with the output signal of the HBF 28, as a tracking driving signal, which changes the level in opposite polarities immediately before and immediately after the generation of the DEF signal, the level fluctuating components cancel each other out in the tracking actuator, so that the tracking actuator continuously maintains a reading point on the center of the track during a period in which the DEF signal is generated.

Although the foregoing respective embodiments have been described for a tracking servo device to which the present invention is applied, the present invention can also be applied to other servo devices such as a focus servo device.

In addition, although the foregoing respective embodiments employ an optical disk as a recording medium, the present invention can also be applied to a servo device for a player which plays back another recording medium such as a magneto-optical disk and an optical card.

Further, the configuration for generating a signal which changes the level in opposite polarities immediately before and immediately after the generation of the DEF signal is not limited to the respective embodiments described above.

According to the servo device for a recording medium player of the present invention as described above, when a servo error signal includes a large fluctuating component immediately before the generation of a blemish detecting signal, a servo hold signal is generated including a signal of opposite polarity to that of the servo error signal immediately after the generation of the blemish detecting signal, so that a reading operation of a pickup is controlled in accordance with the servo hold signal in place of a servo driving signal while the blemish detecting signal is being generated. Thus, it is possible to maintain an appropriate servo state even if a reading point passes through a blemish on a recording medium.

What is claimed is:

1. A servo device for a recording medium player, said servo device generating a servo error signal indicative of an amount of deviation of a position at which a pickup of said recording medium player is reading for playing a recording medium, generating a servo driving signal from the servo error signal through an equalizer, and controlling a reading operation of said pickup in accordance with the servo driving signal, said servo device comprising:

blemish detecting means for detecting a blemish at a reading point on said recording medium by said pickup to generate a blemish detecting signal when a blemish is detected;

first low frequency extracting means for extracting a low frequency component from said servo error signal; and control means for generating a servo hold signal based on an output signal of said first low frequency extracting means, said servo hold signal including, immediately after the generation of said blemish detecting signal, a signal of opposite polarity to the polarity of said servo error signal immediately before generation of said blemish detecting signal, and for controlling the reading operation of said pickup in accordance with said servo hold signal in place of said servo driving signal during a time that said blemish detecting signal is generated.

2. A servo device for a recording medium player according to claim 1, wherein said control means includes:

second low frequency extracting means for extracting a low frequency component from said servo error signal, said second low frequency extracting means having a cut-off frequency higher than a cut-off frequency of said first low frequency extracting means;

subtracting means for calculating a difference signal indicative of a difference in level between an output signal of said first low frequency extracting means and an output signal of said second low frequency extracting means;

holding means for holding said difference signal and for reducing the level of the difference signal held therein by a predetermined time constant during the time that said blemish detecting signal is generated; and adding means for adding an output signal of said holding means to the output signal of said first low frequency extracting means to generate said servo hold signal.

3. A servo device for a recording medium player according to claim 1, wherein said control means includes:

a change-over switch for outputting an output signal of said equalizer during the time that said blemish detecting signal is not generated, and for outputting an output of said first low frequency extracting means during the time that said blemish detecting signal is generated; and high frequency extracting means for receiving the output signal from said change-over switch to generate said servo hold signal.

\* \* \* \* \*